(12) United States Patent
Liu et al.

(10) Patent No.: US 11,968,666 B2
(45) Date of Patent: Apr. 23, 2024

(54) METHOD AND NETWORK NODE FOR COORDINATION OF CONFIGURED SCHEDULING

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 448 days.

(21) Appl. No.: 17/294,717

(22) PCT Filed: Nov. 15, 2019

(86) PCT No.: PCT/CN2019/118841
§ 371 (c)(1),
(2) Date: May 18, 2021

(87) PCT Pub. No.: WO2020/103772
PCT Pub. Date: May 28, 2020

(65) Prior Publication Data
US 2022/0015125 A1 Jan. 13, 2022

(51) Int. Cl.
*H04W 72/20* (2023.01)
*H04W 72/54* (2023.01)

(52) U.S. Cl.
CPC .......... *H04W 72/20* (2023.01); *H04W 72/54* (2023.01)

(58) Field of Classification Search
CPC .............................. H04W 72/20; H04W 72/54
USPC ....................................................... 370/329
See application file for complete search history.

(56) References Cited

U.S. PATENT DOCUMENTS

| 2017/0064731 | A1 | 3/2017 | Wang et al. |
| 2017/0142745 | A1 | 5/2017 | Miao et al. |
| 2018/0027437 | A1* | 1/2018 | Vitthaladevuni ... H04W 52/325 370/252 |
| 2019/0289500 | A1* | 9/2019 | Abedini ................ H04W 72/20 |
| 2019/0394796 | A1* | 12/2019 | Wei ........................ H04W 72/23 |
| 2021/0168826 | A1* | 6/2021 | Zhao ..................... H04L 5/0044 |

FOREIGN PATENT DOCUMENTS

| CN | 102448053 A | 5/2012 |
| CN | 106416386 A | 2/2017 |
| WO | 2015131920 A1 | 9/2015 |

OTHER PUBLICATIONS

Ericsson, "Scheduling in IAB Networks", 3GPP TSG-RAN WG2#104, R2-1816575, Spokane, USA, Nov. 12-16, 2018, 1-3.
Sony, "Resource allocation in IAN", 3GPP TSG RAN WG2 NR AH1807 Meeting, R2-1810115, (Resubmission of R2-1807783), Montreal, Canada, Jul. 2-6, 2018, 1-3.
Qualcomm Incorporated, "Resource Coordination across IAB Topology", 3GPP TSG-RAN WG2 Meeting #102, R2-1808007, (revision of R2-1804865), Busan, South Korea, May 21-25, 2018, 1-6.

* cited by examiner

*Primary Examiner* — Mark G. Pannell
(74) *Attorney, Agent, or Firm* — Murphy, Bilak & Homiller, PLLC (57) ABSTRACT

The present disclosure provides a method (200) in a network node for coordination of Configured Scheduling, CS, among a plurality of backhaul links. The method (200) includes, for each of the plurality of backhaul links: determining (210) at least one CS-related parameter; and transmitting (220) to a scheduling IAB node of that backhaul link the at least one CS-related parameter.

20 Claims, 8 Drawing Sheets

METHOD AND NETWORK NODE FOR COORDINATION OF CONFIGURED SCHEDULING

TECHNICAL FIELD

The present disclosure relates to wireless communication, and more particularly, to methods and network nodes for coordination of Configured Scheduling (CS).

BACKGROUND

In Release 16 of the $3^{rd}$ Generation Partnership Project (3GPP), Integrated Access Backhaul (IAB) has been introduced. For a New Radio (NR) system with the IAB capability, an access point, also referred to as an IAB node, can setup a radio connection with another IAB node in order to reach a donor IAB node which has a wireline backhaul. This radio connection between IAB nodes is referred to as a wireless backhaul link or self-backhaul link.

Figure 1:
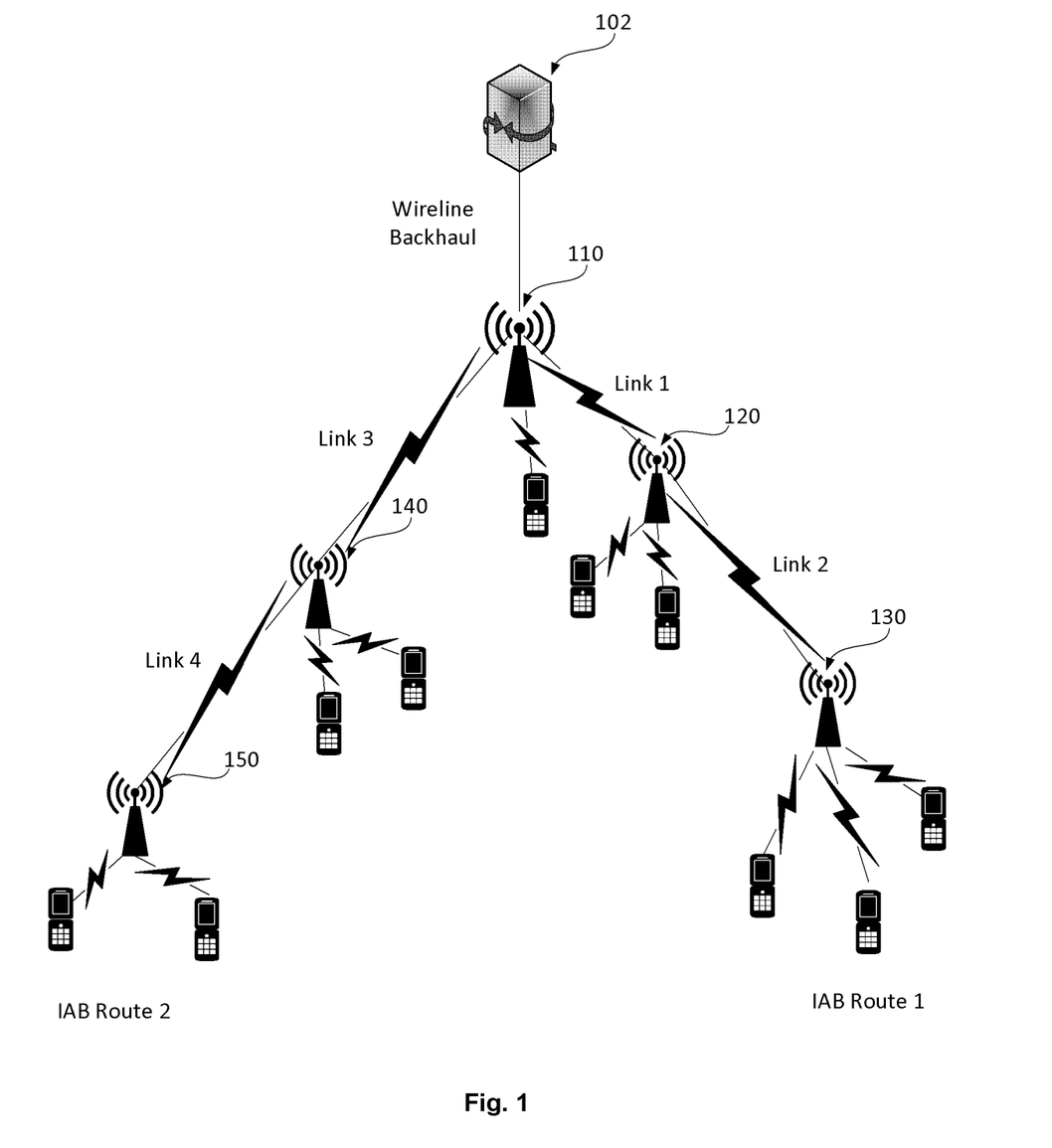
FIG. 1 is a schematic diagram showing an example of an IAB network.

FIG. 1 shows an example of an IAB network. As shown, a donor IAB node 110 has a wireline backhaul link to a gateway 102. The donor IAB 110 has a wireless backhaul link, Link 1, with an IAB node 120, which in turn has a wireless backhaul link, Link 2, with an IAB node 130. In addition to an IAB route 1 including Link 1 and Link 2, the donor IAB node 110 has an IAB route 2 including Link 3 between the donor IAB node 110 and an IAB node 140 and Link 4 between the IAB node 140 and an IAB node 150. As shown, each IAB node may also serve a number of terminal devices. That is, for the IAB node 120 as an example, it has upstream links to/from its parent node (the donor IAB node 120), downstream links to/from its child node (the IAB node 130), and access links to/from its served terminal devices (or User Equipments (UEs)).

Configured Scheduling (CS) is applied in NR in both uplink and downlink, and in downlink it is also referred to as Semi-Persistent Scheduling (SPS). For the downlink CS, some of the parameters, such as a periodicity, a number of Hybrid Automatic Repeat reQuest (HARQ) processes and a CS-Radio Network Temporary Identifier (CS-RNTI), are configured via Radio Resource Control (RRC) signaling, while time-frequency resources and a Modulation and Coding Scheme (MCS) are configured or reconfigured via Physical Downlink Control Channel (PDCCH). A network device (e.g., a gNB) can activate or deactivate a downlink CS for a terminal device via a PDCCH addressed to CS-RNTI. For the uplink CS, there are two types of scheduling schemes, CS Type 1 and Type 2, in the NR. For CS Type 1, all parameters, including a periodicity, a number of HARQ processes, a CS-RNTI, power control parameters, time-frequency resources and a MCS, are configured via RRC signaling. A configured grant is activated when the UE receives an RRC message to configure the CS Type 1. For CS Type 2, a two-phase configuration procedure is applied. In phase 1, a set of parameters, such as a periodicity, a number of HARQ processes, a CS-RNTI and power control parameters are signaled by the gNB via RRC signaling. In phase 2, the serving gNB can conditionally determine when to activate/reactivate the configured grant Type 2 and transmit physical layer parameters, such as time-frequency resources and an MCS, via an uplink grant addressed to the CS-RNTI.

When the CS is applied in an IAB network, if CS-related parameters (e.g., time-frequency resources) are configured for each backhaul link in an IAB route individually without coordination, it may result in low spectral efficiency and/or low Quality of Service (QoS).

SUMMARY

It is an object of the present disclosure to provide methods and network nodes for coordination of CS.

According to a first aspect of the present disclosure, a method in a network node for coordination of CS among a plurality of backhaul links is provided. The method includes, for each of the plurality of backhaul links: determining at least one CS-related parameter; and transmitting to a scheduling node of that backhaul link the at least one CS-related parameter.

In an embodiment, the at least one CS-related parameter may include one or more of: a target bitrate, a periodicity of CS, a number of HARQ processes, a time-frequency resource allocation, a HARQ Block Error Rate (BLER), an MCS, a Logic Channel Priority (LCP) profile parameter, or a power control parameter.

In an embodiment, the LCP profile parameter may include one or more of: a maximum Physical Downlink Shared Channel (PDSCH) duration, a maximum Physical Uplink Shared Channel (PUSCH) duration, or a Sub-Carrier Spacing (SCS) list.

In an embodiment, the method can further include: receiving from the scheduling node of each backhaul link at least one radio parameter and/or traffic status associated with that backhaul link. The at least one CS-related parameter for each backhaul link can be determined based on the radio parameters and/or traffic statuses associated with respective ones of the plurality of backhaul links.

In an embodiment, the at least one radio parameter can include one or more of: Channel State Information (CSI), uplink Signal to Interference and Noise Ratio (SINR), available time-frequency resources, packet loss rate, numerology or transmission duration.

In an embodiment, the transmitting of the at least one CS-related parameter for each backhaul link can be triggered in response to one or more of activation, deactivation, reactivation, configuration, reconfiguration or release of CS for that backhaul link.

In an embodiment, the scheduling node of each backhaul link may be a node on an upstream side of that backhaul link.

In an embodiment, each of the plurality of backhaul links may include an uplink or a downlink and the at least one CS-related parameter can be determined for the uplink or the downlink separately.

In an embodiment, the plurality of backhaul links may be in an IAB network.

In an embodiment, the network node may be a donor IAB node of the IAB network, a scheduling node of any of the plurality of backhaul links, or an Operation, Administration and Maintenance (OAM) node.

According to a second aspect of the present disclosure, a method in a network node for coordination of CS among a plurality of backhaul links is provided. The network node is a scheduling node of one of the plurality of backhaul links. The method includes: determining at least one CS-related parameter for the one backhaul link; and transmitting the at least one CS-related parameter to a scheduling node of a first neighboring backhaul link.

In an embodiment, the method can further include: receiving from a scheduling node of a second neighboring backhaul link, on an opposite side to the first neighboring backhaul link, at least one CS-related parameter for the second neighboring backhaul link. The at least one CS-related parameter for the one backhaul link can be determined based on the at least one CS-related parameter for the second neighboring backhaul link.

In an embodiment, the at least one CS-related parameter for the one backhaul link can be determined based further on CS-related parameters for other links served by the network node.

In an embodiment, the other links may include backhaul links between the network node and other nodes and/or links between the network node and terminal devices.

In an embodiment, the at least one CS-related parameter may include one or more of: a target bitrate, a periodicity of CS, a number of HARQ processes, a time-frequency resource allocation, a HARQ BLER, an MCS, an LCP profile parameter, or a power control parameter.

In an embodiment, the LCP profile parameter may include one or more of: a maximum PDSCH duration, a maximum PUSCH duration, or an SCS list.

In an embodiment, the transmitting of the at least one CS-related parameter may be triggered in response to one or more of activation, deactivation, reactivation, configuration, reconfiguration or release of CS for the one backhaul link.

In an embodiment, the network node may be a node on an upstream side of the one backhaul link.

In an embodiment, each of the plurality of backhaul links may include an uplink and a downlink and the at least one CS-related parameter is determined for the uplink and the downlink separately.

In an embodiment, the first neighboring backhaul link may be an upstream backhaul link or a downstream backhaul link with respect to the one backhaul link.

In an embodiment, the plurality of backhaul links may be in an IAB network.

According to a third aspect of the present disclosure, a method in a network node for coordination of CS among a plurality of backhaul links is provided. The network node is a scheduling node of one of the plurality of backhaul links. The method includes: receiving from another network node at least one CS-related parameter for the one backhaul link; and determining at least one further CS-related parameter for the one backhaul link based on the at least one CS-related parameter for the one backhaul link.

In an embodiment, the at least one CS-related parameter may include a target bitrate, and the at least one further CS-related parameter may include one or more of: a periodicity of CS, a number of HARQ processes, a time-frequency resource allocation, a HARQ BLER, an MCS, an LCP profile parameter, or a power control parameter.

In an embodiment, the plurality of backhaul links may be in an IAB network.

According to a fourth aspect of the present disclosure, a network node is provided. The network node includes a transceiver, a processor and a memory. The memory includes instructions executable by the processor whereby the network node is operative to perform the method according to any of the above first, second or third aspect.

According to a fifth aspect of the present disclosure, a computer readable storage medium is provided. The computer readable storage medium has computer program instructions stored thereon. The computer program instructions, when executed by a processor in a network node, cause the network node to perform the method according to any of the above first, second or third aspect.

With the embodiments of the present disclosure, CS-related parameters for respective backhaul links, e.g., in an IAB route, can be configured either at a centralized node or in a distributed manner with coordination among network nodes. With such coordination, e.g., the spectral efficiency of the backhaul links can be improved.

BRIEF DESCRIPTION OF THE DRAWINGS

The above and other objects, features and advantages will be more apparent from the following description of embodiments with reference to the figures, in which.

DETAILED DESCRIPTION

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable device, a personal digital assistant (PDA), portable computers, desktop computers, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
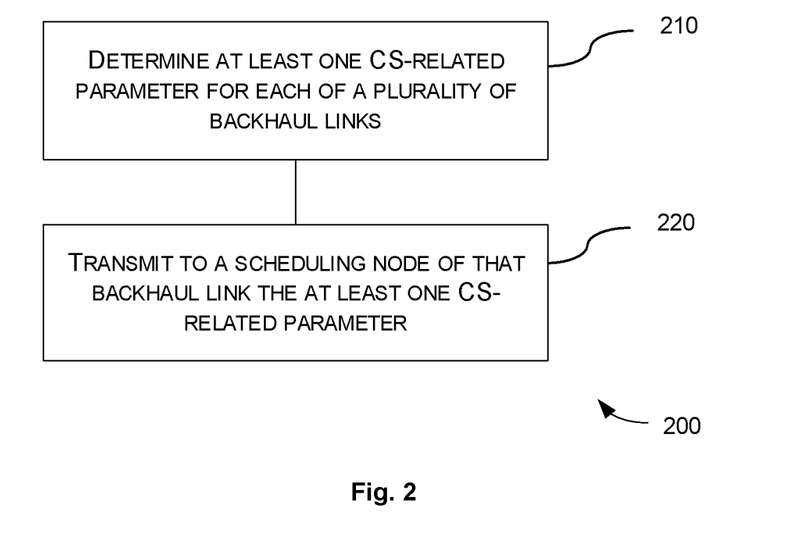
FIG. 2 is a flowchart illustrating a method for coordination of CS according to an embodiment of the present disclosure.

FIG. 2 is a flowchart illustrating a method 200 for coordination of CS according to an embodiment of the present disclosure. The method 200 provides a centralized solution for coordination of CS among a plurality of backhaul links. The plurality of backhaul links can be in an IAB network. The method 200 can be performed at a donor IAB node of the IAB network (e.g., the donor IAB node 110 in FIG. 1), a scheduling node (e.g., scheduling IAB node) of any of the plurality of backhaul links (e.g., any of the IAB nodes 120, 130, 140 and 150), or an Operation, Administration and Maintenance (OAM) node. In the context of present disclosure, the scheduling node of each backhaul link can be a node (e.g., IAB node) on an upstream side of that backhaul link. For example, the IAB node 120 is the scheduling node of Link 2 in FIG. 1.

At block 210, at least one CS-related parameter is determined for each of the plurality of backhaul links.

In an example, the at least one CS-related parameter determined for each backhaul link may include a target bitrate for that backhaul link. In this case, the scheduling node of each backhaul link can allocate SPS downlink assignments or configured uplink grants based on the configured target bitrate. For example, for Link i, $BR_i = N_i * TBS_i$, where $BR_i$ denotes the target bitrate for link i, $N_i$ denotes the number of configured uplink grants or SPS assignments per second, and $TBS_i$ denotes Transport Block Size for link i. The target bitrate can be a function of one or more of: a periodicity of CS, a Modulation and Coding Scheme (MCS), time-frequency resources, an MCS table or a Hybrid Automatic Repeat reQuest (HARQ) Block Error Rate (BLER). For example, for Link i, $BR_i=TBS_i/P_i$, where $P_i$ denotes the periodicity of CS and $TBS_i$ can be dependent on an MCS index, the MCS table and the time-frequency resources. In an example, the target bitrates for all backhaul links in one IAB route can be the same.

Additionally or alternatively, the at least one CS-related parameter determined for each backhaul link may include one or more of: a periodicity of CS, a number of HARQ processes, a time-frequency resource allocation, a HARQ BLER, an MCS, a Logic Channel Priority (LCP) profile parameter, or a power control parameter. In an example, the MCS may include an MCS table and/or an MCS index. The LCP profile parameter may include one or more of: a maximum Physical Downlink Shared Channel (PDSCH) duration, a maximum Physical Uplink Shared Channel (PUSCH) duration, or a Sub-Carrier Spacing (SCS) list.

At block 220, the at least one CS-related parameter determined for each of the plurality of backhaul links is transmitted to a scheduling node of that backhaul link. In an example, the CS-related parameter can be transmitted via Radio Resource Control (RRC) signaling.

In an example, the transmission of the at least one CS-related parameter for each backhaul link may be triggered in response to activation, deactivation or reactivation of CS for that backhaul link, e.g., when the CS Type 2 is applied. Additionally or alternatively, the transmission of the at least one CS-related parameter for each backhaul link may be triggered in response to configuration, reconfiguration or release of CS for that backhaul link, e.g., when the CS Type 1 or CS Type 2 is applied.

In an example, the method 200 can further include: receiving from the scheduling node of each backhaul link at least one radio parameter and/or traffic status associated with that backhaul link. In particular, the at least one radio parameter may include one or more of: Channel State Information (CSI), uplink Signal to Interference and Noise Ratio (SINR), available time-frequency resources, packet loss rate, numerology or transmission duration. In the block 210, the at least one CS-related parameter for each backhaul link can be determined based on the radio parameters and/or traffic status associated with respective ones of the plurality of backhaul links. This allows the centralized coordination to be based on radio and/or traffic information collected from the respective backhaul links, thereby achieving a more efficient CS coordination and resource allocation in the IAB network. For example, the target bit-rate can be determined based on the traffic status and one or more other parameters such as a periodicity of CS, a latency requirement of service and a service availability. The number of HARQ processes can be determined based on HARQ round trip time and a density of configured uplink grants/SPS assignments. The HARQ BLER can be determined based on the CSI, the uplink SINR, an interference report and a QoS requirement. The time-frequency resources and the MCS can be determined based on the target bitrate.

In an example, each of the plurality of backhaul links may be an uplink or a downlink. The at least one CS-related parameter can be determined for the uplink or the downlink separately. That is, the coordination of CS can be applied individually in an upstream direction and in a downstream direction. Further, the coordination of CS, i.e., the configuration of the CS-related parameters, can be applied individually to each IAB route (from a donor IAB node at the highest level to a child IAB node at the lowest level, i.e., farthest from the donor IAB in the hierarchy).

Figure 3:
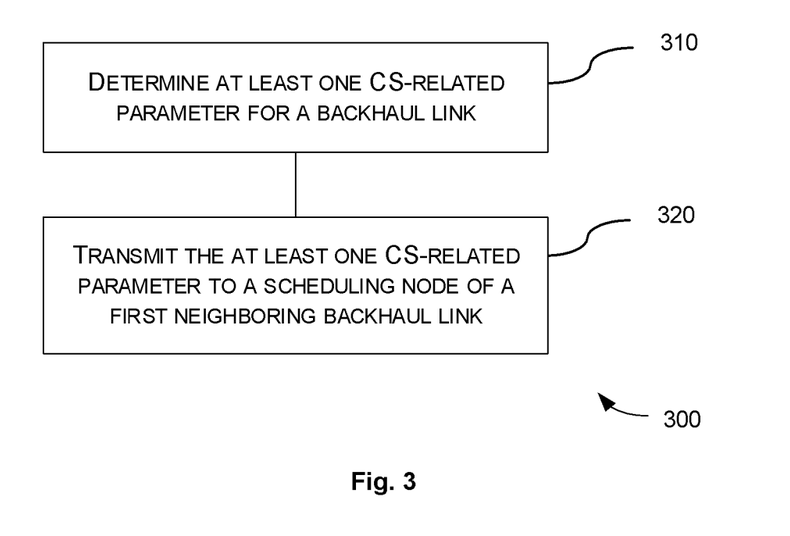
FIG. 3 is a flowchart illustrating a method coordination of CS according to another embodiment of the present disclosure.

FIG. 3 is a flowchart illustrating a method 300 for coordination of CS according to an embodiment of the present disclosure. The method 300 provides a distributed solution for coordination of CS among a plurality of backhaul links. The plurality of backhaul links may be in an IAB network. The method 300 can be performed at a scheduling node (e.g., scheduling IAB node) of one of the plurality of backhaul links (e.g., a node (e.g., IAB node) on an upstream side of the one backhaul link).

At block 310, at least one CS-related parameter for the one backhaul link is determined.

Here, the at least one CS-related parameter may include one or more of: a target bitrate, a periodicity of CS, a number of HARQ processes, a time-frequency resource allocation, a HARQ BLER, an MCS, an LCP profile parameter, or a power control parameter. In an example, the MCS may include an MCS table and/or an MCS index. The LCP profile parameter may include one or more of: a maximum PDSCH duration, a maximum PUSCH duration, or an SCS list.

At block 320, the at least one CS-related parameter is transmitted to a scheduling node of a first neighboring backhaul link. Here, the first neighboring backhaul link may be an upstream backhaul link or a downstream backhaul link with respect to the one backhaul link.

In an example, the method 300 can further include receiving from a scheduling node of a second neighboring backhaul link, on an opposite side to the first neighboring backhaul link, at least one CS-related parameter for the second neighboring backhaul link. That is, when the first neighboring backhaul link is an upstream backhaul link with respect to the one backhaul link, the second neighboring backhaul link can be a downstream backhaul link with respect to the one backhaul link, or vice versa. That is, the coordination can be performed iteratively from the highest level to the lowest level, i.e., from a donor IAB node to a child IAB node farthest from the donor IAB in the hierarchy, or vice versa, which can be configurable by e.g., the donor IAB node or any other IAB node in the IAB network.

Accordingly, in the block 310, the at least one CS-related parameter for the one backhaul link can be determined based on the at least one CS-related parameter for the second neighboring backhaul link. In an example, the at least one CS-related parameter for the one backhaul link can be determined based further on CS-related parameters for other links served by the scheduling node of the one backhaul link. Here, the other links may include backhaul links between the scheduling node of the one backhaul link and other nodes and/or links between the scheduling node of the one backhaul link and terminal devices.

For example, the scheduling node of the one backhaul link may configure the same periodicity of CS, the same number of HARQ processes, the same HARQ BLER, the same MCS table, and/or the same target bitrate as an upstream node. In another example, the scheduling node of the one backhaul link may derive the LCP profile parameters (e.g. the maximum PDSCH or PUSCH duration and/or the SCS) from the CS-related parameters received from an upstream or downstream node. For instance, the SCS can be larger than or equal to the received SCS, and the maximum PDSCH or PUSCH duration may not exceed the received maximum PDSCH or PUSCH duration.

In an example, the transmission of the at least one CS-related parameter for each backhaul link may be triggered in response to activation, deactivation or reactivation of CS for that backhaul link, e.g., when the CS Type 2 is applied. Additionally or alternatively, the transmission of the at least one CS-related parameter for each backhaul link may be triggered in response to configuration, reconfiguration or release of CS for that backhaul link, e.g., when the CS Type 1 or CS Type 2 is applied.

In an example, each of the plurality of backhaul links may be an uplink or a downlink. The at least one CS-related parameter can be determined for the uplink or the downlink separately.

Figure 4:
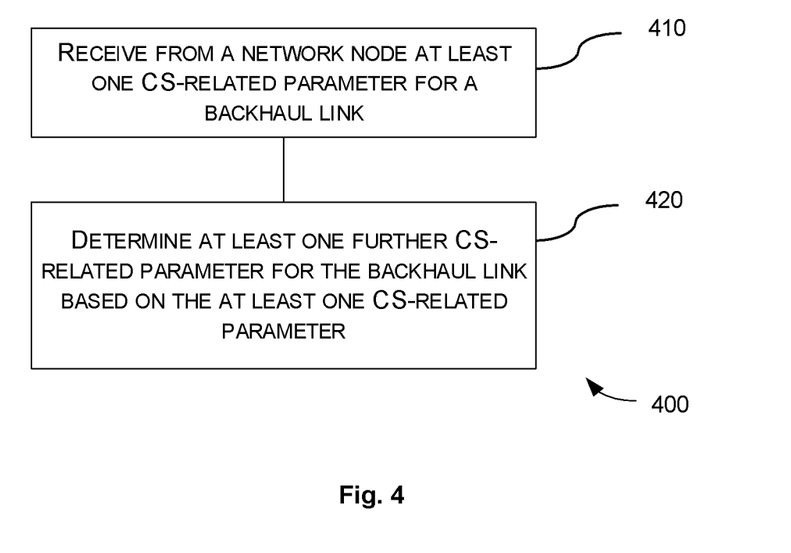
FIG. 4 is a flowchart illustrating a method coordination of CS according to yet another embodiment of the present disclosure.

FIG. 4 is a flowchart illustrating a method 400 for coordination of CS according to an embodiment of the present disclosure. The method 400 provides a coordination of CS among a plurality of backhaul links. The plurality of backhaul links can be in an IAB network. The method 400 can be performed at a scheduling node (e.g., scheduling IAB node) of one of the plurality of backhaul links (e.g., a node (e.g., IAB node) on an upstream side of the one backhaul link).

At block 410, at least one CS-related parameter for the one backhaul link is received from another network node. Here, the other network node can be a centralized coordination node (e.g., a donor IAB node) as in the method 200, or an upstream or downstream node as in the method 300.

At block 420, at least one further CS-related parameter for the one backhaul link is determined based on the at least one CS-related parameter. Further, CS-related parameters for terminal devices served by the scheduling node of the one backhaul node can be determined based on the at least one CS-related parameter.

In an example, the at least one CS-related parameter may include a target bitrate. The at least one further CS-related parameter may include one or more of: a periodicity of CS, a number of HARQ processes, a time-frequency resource allocation, a HARQ BLER, an MCS, an LCP profile parameter, or a power control parameter. In an example, the MCS may include an MCS table and/or an MCS index. The LCP profile parameter may include one or more of: a maximum PDSCH duration, a maximum PUSCH duration, or an SCS list. For example, the periodicity, the number of HARQ processes, the time-frequency resource allocation, the MCS and/or the HARQ BLER can be determined to achieve the target bitrate.

Figure 5:
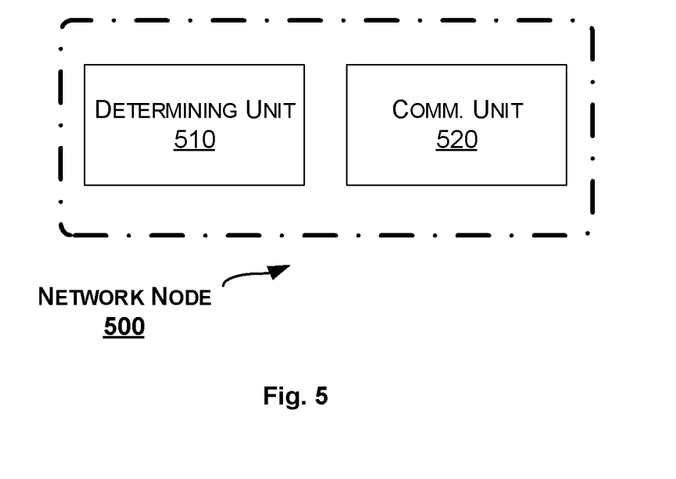
FIG. 5 is a block diagram of a network node according to an embodiment of the present disclosure.

Correspondingly to the method 200, 300 or 400 as described above, a network node is provided. FIG. 5 is a block diagram of a network node 500 according to an embodiment of the present disclosure. The network node 500 can be configured for coordination of CS among a plurality of backhaul links, e.g., in an IAB network.

As shown in FIG. 5, correspondingly to the method 200, the network node 500 includes a determining unit 510 configured to determine at least one CS-related parameter for each of the plurality of backhaul links. The network node 500 further includes a communication unit 520 configured to transmit the at least one CS-related parameter determined for each of the plurality of backhaul links to a scheduling node of that backhaul link.

In an embodiment, the at least one CS-related parameter may include one or more of: a target bitrate, a periodicity of CS, a number of HARQ processes, a time-frequency resource allocation, a HARQ BLER, an MCS, an LCP profile parameter, or a power control parameter.

In an embodiment, the LCP profile parameter may include one or more of: a maximum PDSCH duration, a maximum PUSCH duration, or an SCS list.

In an embodiment, the communication unit 520 can further be configured to receive from the scheduling node of each backhaul link at least one radio parameter and/or traffic status associated with that backhaul link. The determining unit 510 can determine the at least one CS-related parameter for each backhaul link based on the radio parameters and/or traffic statuses associated with respective ones of the plurality of backhaul links.

In an embodiment, the at least one radio parameter can include one or more of: CSI, uplink SINR, available time-frequency resources, packet loss rate, numerology or transmission duration.

In an embodiment, the transmitting of the at least one CS-related parameter for each backhaul link can be triggered in response to one or more of activation, deactivation, reactivation, configuration, reconfiguration or release of CS for that backhaul link.

In an embodiment, the scheduling node of each backhaul link may be a node on an upstream side of that backhaul link.

In an embodiment, each of the plurality of backhaul links may include an uplink or a downlink and the at least one CS-related parameter can be determined for the uplink or the downlink separately.

Alternatively, correspondingly to the method 300, the network node 500 can be a scheduling node of one of the plurality of backhaul links. The determining unit 510 can be configured to determine at least one CS-related parameter for the one backhaul link. The communication unit 520 can be configured to transmit the at least one CS-related parameter to a scheduling node of a first neighboring backhaul link.

In an embodiment, the communication unit 520 can further be configured to receive from a scheduling node of a second neighboring backhaul link, on an opposite side to the first neighboring backhaul link, at least one CS-related parameter for the second neighboring backhaul link. The determining unit 510 can be configured to determine the at least one CS-related parameter for the one backhaul link based on the at least one CS-related parameter for the second neighboring backhaul link.

In an embodiment, the determining unit 510 can be configured to determine the at least one CS-related parameter for the one backhaul link based further on CS-related parameters for other links served by the network node.

In an embodiment, the other links may include backhaul links between the network node and other nodes and/or links between the network node and terminal devices.

In an embodiment, the at least one CS-related parameter may include one or more of: a target bitrate, a periodicity of CS, a number of HARQ processes, a time-frequency resource allocation, a HARQ BLER, an MCS, an LCP profile parameter, or a power control parameter.

In an embodiment, the LCP profile parameter may include one or more of: a maximum PDSCH duration, a maximum PUSCH duration, or an SCS list.

In an embodiment, the transmitting of the at least one CS-related parameter may be triggered in response to one or more of activation, deactivation, reactivation, configuration, reconfiguration or release of CS for that backhaul link.

In an embodiment, the network node 500 may be a node on an upstream side of the one backhaul link.

In an embodiment, each of the plurality of backhaul links may include an uplink and a downlink and the at least one CS-related parameter is determined for the uplink and the downlink separately.

In an embodiment, the first neighboring backhaul link may be an upstream backhaul link or a downstream backhaul link with respect to the one backhaul link.

Alternatively, correspondingly to the method 400, the network node 500 can be a scheduling node of one of the plurality of backhaul links. The communication unit 520 can be configured to receive from another network node at least one CS-related parameter for the one backhaul link. The determining unit 510 can be configured to determine at least one further CS-related parameter for the one backhaul link based on the at least one CS-related parameter for the one backhaul link.

In an embodiment, the at least one CS-related parameter may include a target bitrate, and the at least one further CS-related parameter may include one or more of: a periodicity of CS, a number of HARQ processes, a time-frequency resource allocation, a HARQ BLER, an MCS, an LCP profile parameter, or a power control parameter.

The determining unit 510 and the communication unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2, 3 or 4.

Figure 6:
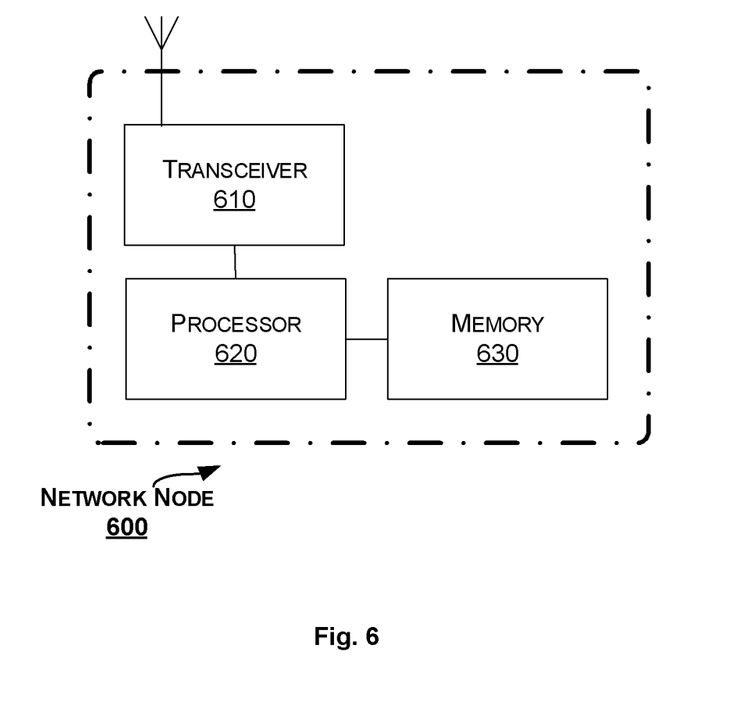
FIG. 6 is a block diagram of a network node according to another embodiment of the present disclosure.

FIG. 6 is a block diagram of a network node 600 according to another embodiment of the present disclosure. The network node 600 can be configured for coordination of CS among a plurality of backhaul links, e.g., in an IAB network.

The network node 600 includes one or more processors 610 and one or more memories 620. The memories 620 contain instructions executable by the processors 610 whereby the network node 600 is operative to perform the actions, e.g., of the procedure described earlier in conjunction with FIG. 2, 3 or 4.

In particular, correspondingly to the method 200, the memories 620 contain instructions executable by the processors 610 whereby the network node 600 is operative to, for each of the plurality of backhaul links: determine at least one CS-related parameter; and transmit to a scheduling node of that backhaul link the at least one CS-related parameter.

In an embodiment, the at least one CS-related parameter may include one or more of: a target bitrate, a periodicity of CS, a number of HARQ processes, a time-frequency resource allocation, a HARQ BLER, an MCS, an LCP profile parameter, or a power control parameter.

In an embodiment, the LCP profile parameter may include one or more of: a maximum PDSCH duration, a maximum PUSCH duration, or an SCS list.

In an embodiment, the memories 620 may further contain instructions executable by the processors 610 whereby the network node 600 is operative to: receive from the scheduling node of each backhaul link at least one radio parameter and/or traffic status associated with that backhaul link. The at least one CS-related parameter for each backhaul link can be determined based on the radio parameters and/or traffic statuses associated with respective ones of the plurality of backhaul links.

In an embodiment, the at least one radio parameter can include one or more of: CSI, uplink SINR, available time-frequency resources, packet loss rate, numerology or transmission duration.

In an embodiment, the transmitting of the at least one CS-related parameter for each backhaul link can be triggered in response to one or more of: activation, deactivation, reactivation, configuration, reconfiguration or release of CS for that backhaul link.

In an embodiment, the scheduling node of each backhaul link may be a node on an upstream side of that backhaul link.

In an embodiment, each of the plurality of backhaul links may include an uplink or a downlink and the at least one CS-related parameter can be determined for the uplink or the downlink separately.

In an embodiment, the network node 600 may be a donor IAB node of the IAB network, a scheduling node of any of the plurality of backhaul links, or an OAM node.

Alternatively, correspondingly to the method 300, the network node 600 can be a scheduling node of one of the plurality of backhaul links. The memories 620 contain instructions executable by the processors 610 whereby the network node 600 is operative to: determine at least one CS-related parameter for the one backhaul link; and transmit the at least one CS-related parameter to a scheduling node of a first neighboring backhaul link.

In an embodiment, the memories 620 may further contain instructions executable by the processors 610 whereby the network node 600 is operative to: receive from a scheduling node of a second neighboring backhaul link, on an opposite side to the first neighboring backhaul link, at least one CS-related parameter for the second neighboring backhaul link. The at least one CS-related parameter for the one backhaul link can be determined based on the at least one CS-related parameter for the second neighboring backhaul link.

In an embodiment, the at least one CS-related parameter for the one backhaul link can be determined based further on CS-related parameters for other links served by the network node.

In an embodiment, the other links may include backhaul links between the network node and other nodes and/or links between the network node and terminal devices.

In an embodiment, the at least one CS-related parameter may include one or more of: a target bitrate, a periodicity of CS, a number of HARQ processes, a time-frequency resource allocation, a HARQ BLER, an MCS, an LCP profile parameter, or a power control parameter.

In an embodiment, the LCP profile parameter may include one or more of: a maximum PDSCH duration, a maximum PUSCH duration, or an SCS list.

In an embodiment, the transmitting of the at least one CS-related parameter may be triggered in response to one or more of activation, deactivation, reactivation, configuration, reconfiguration or release of CS for that backhaul link.

In an embodiment, the network node 600 may be a node on an upstream side of the one backhaul link.

In an embodiment, each of the plurality of backhaul links may include an uplink and a downlink and the at least one CS-related parameter is determined for the uplink and the downlink separately.

In an embodiment, the first neighboring backhaul link may be an upstream backhaul link or a downstream backhaul link with respect to the one backhaul link.

Alternatively, correspondingly to the method 400, the network node 600 can be a scheduling node of one of the plurality of backhaul links. The memories 620 contain instructions executable by the processors 610 whereby the network node 600 is operative to: receive from another network node at least one CS-related parameter for the one backhaul link; and determine at least one further CS-related parameter for the one backhaul link based on the at least one CS-related parameter for the one backhaul link.

In an embodiment, the at least one CS-related parameter may include a target bitrate, and the at least one further CS-related parameter may include one or more of: a periodicity of CS, a number of HARQ processes, a time-frequency resource allocation, a HARQ BLER, an MCS, an LCP profile parameter, or a power control parameter.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processors 610, cause the network node 600 to perform the actions, e.g., of the procedure described earlier in conjunction with FIG. 2, 3 or 4.

The computer program product may be configured as a computer program code structured in computer program modules. The computer program modules could essentially perform the actions of the flow illustrated in FIG. 2, 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
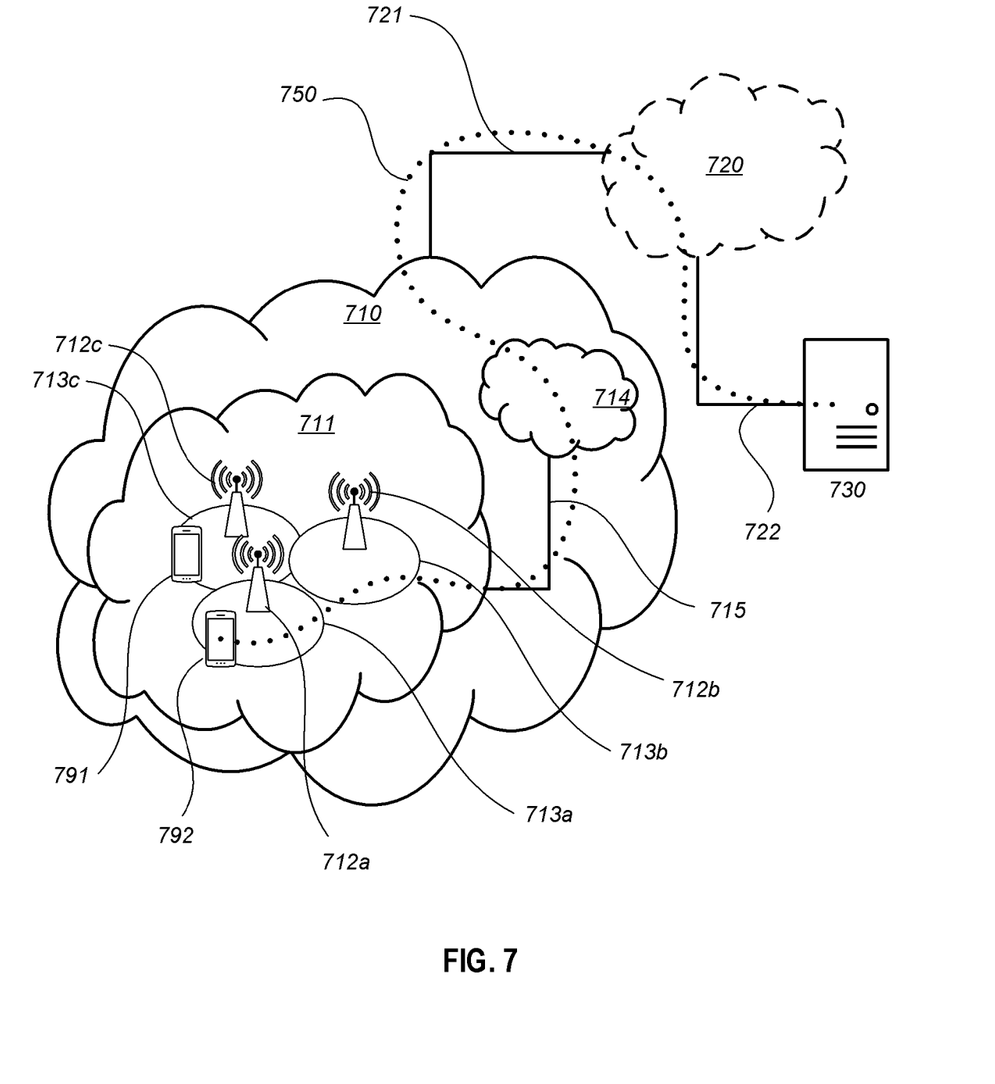
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712*a*, 712*b*, 712*c*, such as NBs, eNBs, gNBs or other types of wireless access points, each defining a corresponding coverage area 713*a*, 713*b*, 713*c*. Each base station 712*a*, 712*b*, 712*c* is connectable to the core network 714 over a wired or wireless connection 715. A first user equipment (UE) 791 located in coverage area 713*c* is configured to wirelessly connect to, or be paged by, the corresponding base station 712*c*. A second UE 792 in coverage area 713*a* is wirelessly connectable to the corresponding base station 712*a*. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
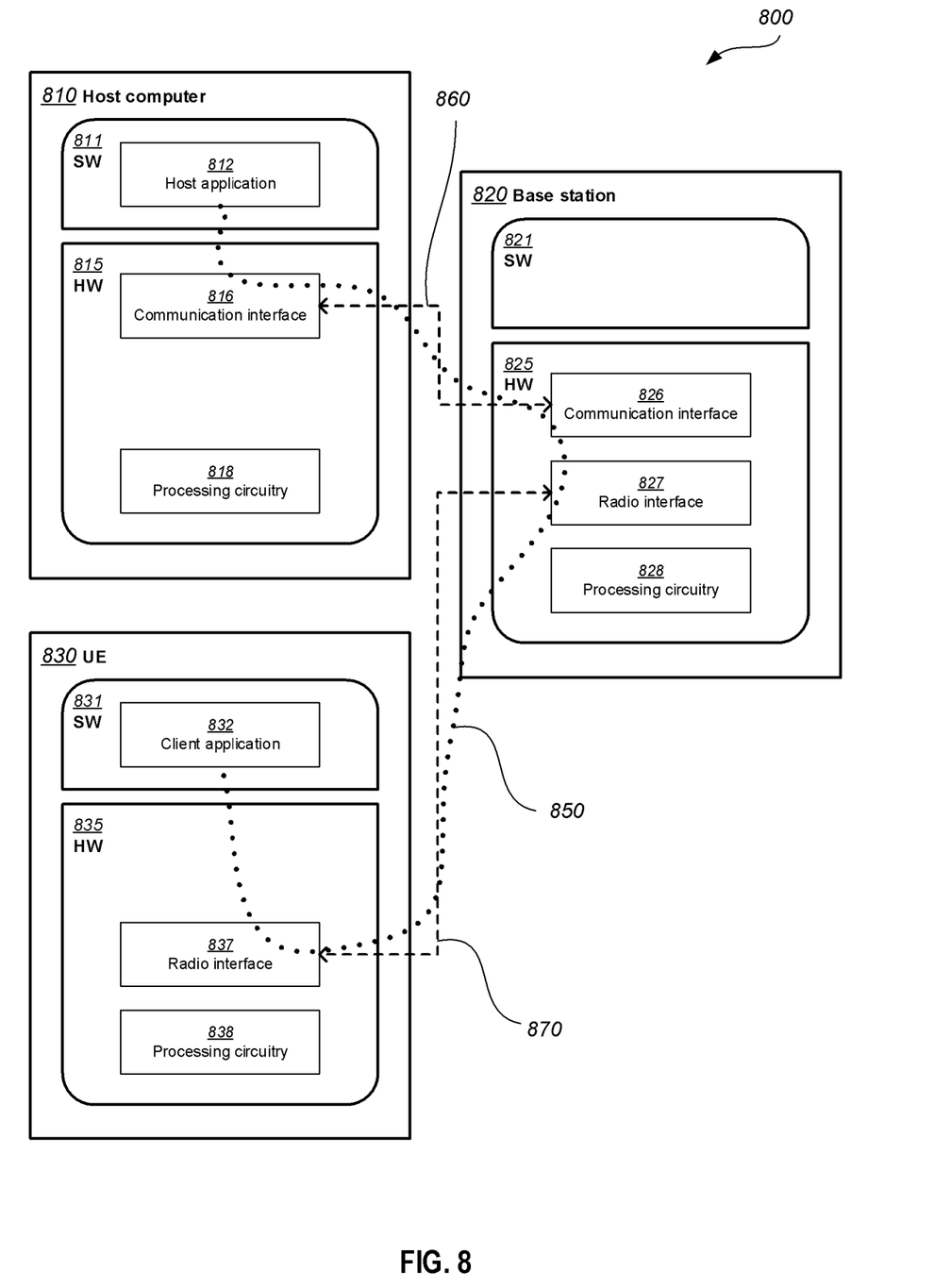
FIG. 8 is a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
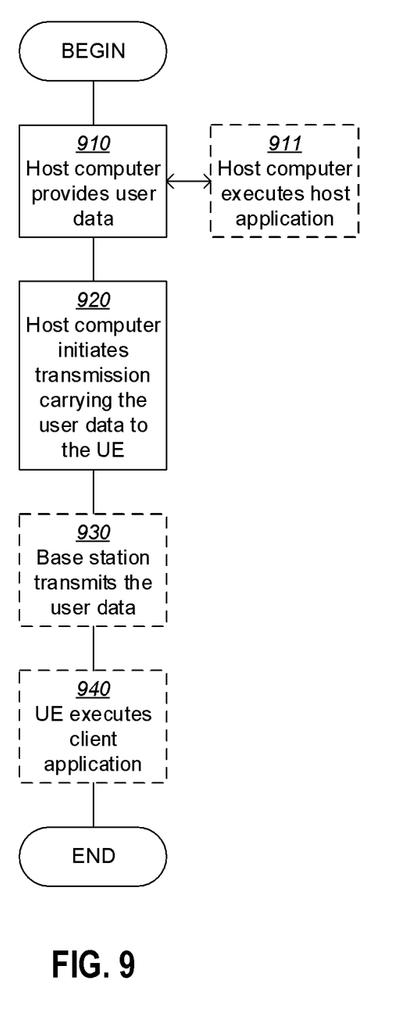
FIGS. 9 to 12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
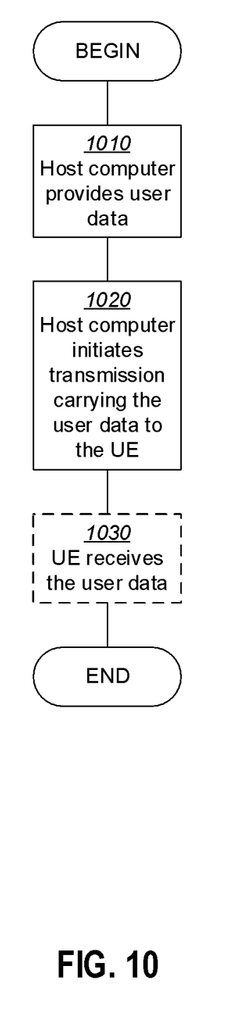

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figure 11:
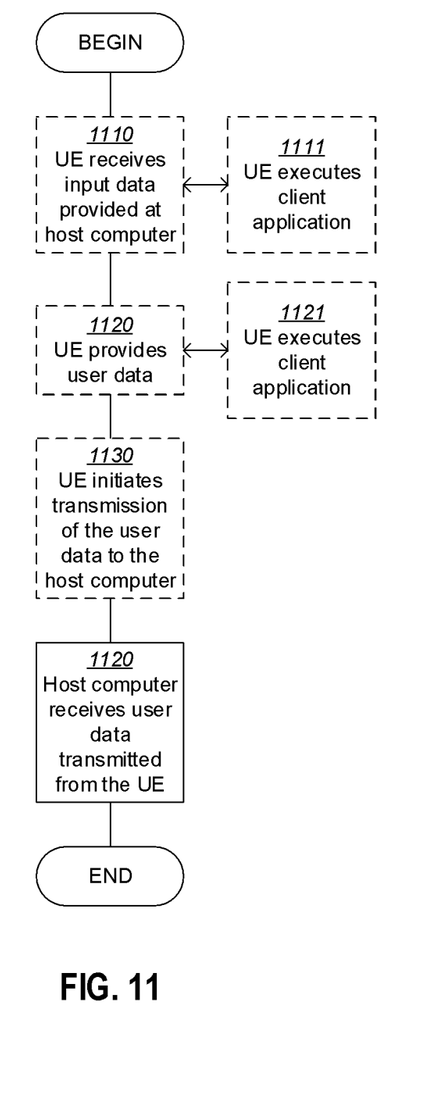

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

Figure 12:
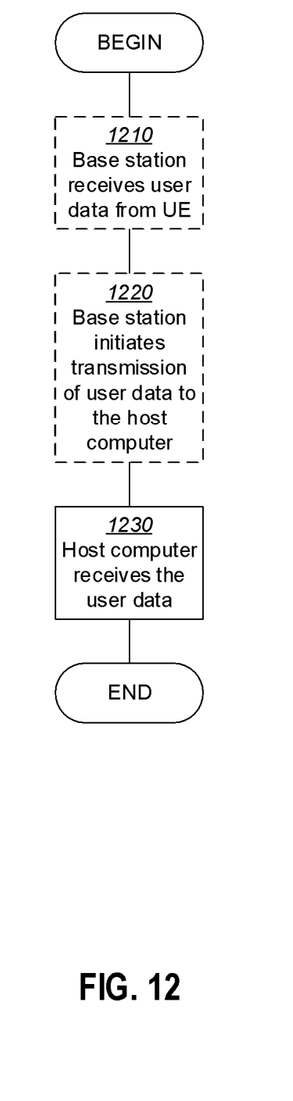

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network node for coordination of Configured Scheduling (CS) among a plurality of backhaul links, the method comprising, for each of the plurality of backhaul links:
   determining at least one CS-related parameter; and
   transmitting, to a scheduling node of that backhaul link, the at least one CS-related parameter,
   wherein the at least one CS-related parameter comprises one or more of:
   a periodicity of CS, or
   a Logic Channel Priority (LCP) profile parameter.

2. The method of claim 1, wherein the at least one CS-related parameter further comprises one or more of:
   a target bitrate,
   a number of Hybrid Automatic Repeat reQuest (HARQ) processes,
   a time-frequency resource allocation,
   a HARQ Block Error Rate (BLER),
   a Modulation and Coding Scheme (MCS), or
   a power control parameter.

3. The method of claim 1, wherein the LCP profile parameter comprises one or more of:
   a maximum Physical Downlink Shared Channel (PDSCH) duration,
   a maximum Physical Uplink Shared Channel (PUSCH) duration, or
   a Sub-Carrier Spacing (SCS) list.

4. The method of claim 1, further comprising receiving, from the scheduling node of each backhaul link, at least one radio parameter and/or traffic status associated with that backhaul link, wherein the at least one CS-related parameter for each backhaul link is determined based on the radio parameters and/or traffic statuses associated with respective ones of the plurality of backhaul links.

5. The method of claim 4, wherein the at least one radio parameter comprises one or more of: Channel State Information (CSI) uplink Signal to Interference and Noise Ratio (SINR) available time-frequency resources, packet loss rate, numerology or transmission duration.

6. The method of claim 1, wherein the transmitting of the at least one CS-related parameter for each backhaul link is triggered in response to one or more of activation, deactivation, reactivation, configuration, reconfiguration or release of CS for that backhaul link.

7. The method of claim 1, wherein the scheduling node of each backhaul link is a node on an upstream side of that backhaul link.

8. The method of claim 1, wherein each of the plurality of backhaul links comprises an uplink or a downlink and the at least one CS-related parameter is determined for the uplink or the downlink separately.

9. A method in a network node for coordination of Configured Scheduling (CS) among a plurality of backhaul links, the network node being a scheduling node of one of the plurality of backhaul links, the method comprising:
   determining at least one CS-related parameter for the one backhaul link; and
   transmitting the at least one CS-related parameter to a scheduling node of a first neighboring backhaul link,
   wherein the at least one CS-related parameter comprises one or more of:
   a periodicity of CS, or
   a Logic Channel Priority (LCP) profile parameter.

10. The method of claim 9, further comprising receiving, from a scheduling node of a second neighboring backhaul link, on an opposite side to the first neighboring backhaul link, at least one CS-related parameter for the second neighboring backhaul link, wherein the at least one CS-related parameter for the one backhaul link is determined based on the at least one CS-related parameter for the second neighboring backhaul link.

11. The method of claim 10, wherein the at least one CS-related parameter for the one backhaul link is determined based further on CS-related parameters for other links served by the network node.

12. The method of claim 11, wherein the other links comprise backhaul links between the network node and other nodes and/or links between the network node and terminal devices.

13. The method of claim 9, wherein the at least one CS-related parameter further comprises one or more of:
   a target bitrate,
   a number of Hybrid Automatic Repeat reQuest (HARQ) processes,
   a time-frequency resource allocation,
   a HARQ Block Error Rate (BLER),
   a Modulation and Coding Scheme (MCS), or
   a power control parameter.

14. The method of claim 9, wherein the LCP profile parameter comprises one or more of:
   a maximum Physical Downlink Shared Channel (PDSCH) duration,
   a maximum Physical Uplink Shared Channel (PUSCH) duration, or
   a Sub-Carrier Spacing (SCS) list.

15. The method of claim 9, wherein the transmitting of the at least one CS-related parameter is triggered in response to one or more of activation, deactivation, reactivation, configuration, reconfiguration or release of CS for that backhaul link.

16. The method of claim 9, wherein the network node is a node on an upstream side of the one backhaul link.

17. The method of claim 9, wherein each of the plurality of backhaul links comprises an uplink and a downlink and the at least one CS-related parameter is determined for the uplink and the downlink separately.

18. The method of claim 9, wherein the first neighboring backhaul link is an upstream backhaul link or a downstream backhaul link with respect to the one backhaul link.

19. A method in a network node for coordination of Configured Scheduling (CS) among a plurality of backhaul links, the network node being a scheduling node of one of the plurality of backhaul links, the method comprising:

receiving, from another network node, at least one CS-related parameter for the one backhaul link; and determining at least one further CS-related parameter for the one backhaul link based on the at least one CS-related parameter, wherein the at least one CS-related parameter comprises one or more of:
a periodicity of CS, or
a Logic Channel Priority (LCP) profile parameter.

20. The method of claim 19, wherein the at least one CS-related parameter further comprises a target bitrate, and the at least one further CS-related parameter comprises one or more of:
a periodicity of CS,
a number of Hybrid Automatic Repeat reQuest (HARQ) processes,
a time-frequency resource allocation,
a HARQ Block Error Rate (BLER),
a Modulation and Coding Scheme (MCS),
a Logic Channel Priority (LCP) profile parameter, or
a power control parameter.

\* \* \* \* \*